United States Patent [19]
Carlström

[11] 3,823,746
[45] July 16, 1974

[54] FIBER-REINFORCED PLASTIC TUBING WITH CONTINUOUS FIBERS, FOR PRESSURIZED WATER CONDUITS IN THE GROUND

[76] Inventor: Börge Ingmar Carlström, Postalde, 317, Sweden

[22] Filed: Sept. 29, 1971

[21] Appl. No.: 184,932

[52] U.S. Cl. .............................. 138/144, 138/141
[51] Int. Cl. .................................... F16l 9/14
[58] Field of Search .......... 138/144, 153, 129, 137, 138/140, 141; 156/143, 144

[56] References Cited
UNITED STATES PATENTS

| | | | |
|---|---|---|---|
| 2,645,249 | 7/1953 | Davis | 138/137 |
| 2,862,524 | 12/1958 | Smith | 138/144 |
| 3,406,724 | 10/1968 | Carlstrom et al. | 138/141 |
| 3,548,884 | 12/1970 | Ambrose | 138/144 |

*Primary Examiner*—Houston S. Bell, Jr.
*Assistant Examiner*—Frederick R. Schmidt

[57] ABSTRACT

For fiber-reinforced plastic tubing which is to be laid in the ground and subjected to inner over-pressure the windings of continuous fibers are concentrated in the central part of the wall of the tube, thereby minimizing flexural stress of the fibers.

6 Claims, No Drawings

FIBER-REINFORCED PLASTIC TUBING WITH CONTINUOUS FIBERS, FOR PRESSURIZED WATER CONDUITS IN THE GROUND

Swedish Patent application No. 6218/67 described a new sandwich tubing containing continuous fibers disposed in annular direction. According to one embodiment of said invention, the fibers in such sandwich tubes were to be concentrated in the outer layers of the tubing.

It has now been found that the previously proposed construction is not suitable for flexible fiber-reinforced plastic tubing which is to be laid in the ground, which tubing is subjected to inner over-pressure. The reason is that when flexible tubing is laid in the ground a certain deformation of the tubing occurs. With very flexible tubing, this deformation is considerable, e.g., in the order of 10–15 percent. This means that quite considerable flexural tension occurs in the walls of the tubing which, in the case of fiber-reinforced tubing, means that the fibers are already under high tension. There is therefore only slight reinforcement to take up the inner pressure.

After a flexible tube has been laid in the ground and filled with water under pressure, the tube endeavors to become circular again and the deformation is reduced. However, the tension caused by the original deformation is not reduced when the deformation per se is reduced by reason of the fact that the deformation picture is no longer elliptical. Due to the irregular deformation picture, new stresses arise which are of about the same magnitude as before. These new discoveries show that in a conventionally made sandwich tube having fiber reinforcement in the outer part of the tube, the fiber reinforcement is not fully exploited.

On the other hand, in the new sandwich tubing according to the present invention, the fibers — which suitably are glass fibers — shall be concentrated in the center of the tube. In this way they are subjected to very little stress during deformation of the tube. Furthermore, the ratio between the tube wall and the inner diameter should be 0.01 – 0.02, preferably about 0.015, so that original deformation is limited to 3–5 percent if the tubing is laid at a depth of 4–6 m in the ground and the modulus of elasticity of the material covering it is 20–30 kgf/cm$^2$. Under such conditions there is hardly any flexural stress in the fibers in the central part of the tube wall, and the fibers there are exploited to the full to absorb the inner pressure. The fibers may, if desired, also be applied in the outer layers of the tube wall. These outer layers mainly serve to give the tubing good stability and to take up flexural stresses. If the laminate resin in the outer layers has a yield point which is more than twice that of the laminate resin in the central part of the tube, the fibers in the outer layers also help to take up the inner pressure. The thickness of the central part should preferably be 20–50 percent of the thickness of the tube wall. The thickness of each of the reinforced outer layers, if such outer layers exist, should suitably be 5–20 percent of the total thickness of the tube wall. The percentage of glass fiber in the reinforced layers should be 40–70 percent by weight.

SPECIFIC EXAMPLE

The following provides a detailed disclosure of one specific embodiment of the invention.

Three layers of so-called 20 ends glass roving impregnated with unsaturated polyester of special type (A) having a yield point of 7 percent are wound on to a rotating core having an outer diameter of 500 mm. A layer of sand is then applied on top of the layer formed, the sand layer having a thickness of 1 mm and using the same polyester as binder. This is followed by a sand layer having a thickness of 1 mm with polyester of standard type (B) having a yield point of 35 percent. After this 10 layers of 20 ends roving impregnated with polyester B are wound on. On top of this a sand layer is applied having a thickness of 1 mm and containing polyester B, followed by a sand layer 1 mm thick containing polyester A. Finally three layers of 20 ends roving with polyester A are wound on.

The finished tubing has a thickness of about 7 mm, and a modulus of elasticity of about 150,000 kg/cm$^2$. When laid at a depth of 5 m in friction earth having $E'_s = 20$ kgf/cm$^2$, it has a deformation of 4 percent. When the tubing is subjected to an inner pressure of 10 kgf/cm$^2$ the deformation is reduced to 1 percent.

The tubing manufactured according to the invention may, if desired, contain more than five carrying layers. Instead of one intermediate layer, there may be used two or more. Instead of one inner covering layer there may be used two, for example, one of them containing, for example, continuous fibers directed substantially in axial direction. Epoxy resin or polyurethane resin may be used instead of the polyester resin of the above specific example.

I claim:

1. Flexible reinforced plastic tubing of sandwich type tube wall including inner, central and outer layers having annularly directed reinforcing materials in the form of a plurality of windings of continuous fibers separated by intermediate layers including a plastic and a granular filler, wherein the improvement comprises: concentrating the reinforcing material in the central layer of the tube wall.

2. Flexible plastic tubing according to claim 1, said fibers occur in three layers, a central layer and two outer layers, and that these three layers are separated by intermediate layers consisting of a mixture of plastic and granular filler.

3. Flexible plastic tubing according to claim 2, wherein the thickness of the central layer is 20–50 percent of the thickness of the tube wall, and wherein each intermediate layer has a thickness 5–40 percent of that of the tube wall.

4. Flexible plastic tubing according to claim 2, wherein the intermediate layer comprises by weight 50–85 percent filler.

5. Flexible tubing according to claim 1, in which the plastic consists of a thermosetting resin.

6. Flexible tubing according to claim 5, in which the thermosetting resin is a polyester resin.

* * * * *